US006949863B2

(12) United States Patent
Otani et al.

(10) Patent No.: US 6,949,863 B2
(45) Date of Patent: Sep. 27, 2005

(54) METAL-GRAPHITE BRUSH

(75) Inventors: Takayoshi Otani, Ise Mie (JP); Osamu Takada, Matsusaka Mie (JP); Toshio Ishikawa, Kariya Aichi (JP); Mitsuo Ikeda, Matsusaka Mie (JP); Yoichi Sakaura, Matsusaka Mie (JP); Naoki Morita, Matsusaka Mie (JP); Kyoji Inukai, Toyota (JP); Youichi Murakami, Aichi (JP); Yasuyuki Wakahara, Kariya (JP); Masami Niimi, Handa (JP)

(73) Assignees: Tris Inc. (JP); Denso Corporation (JP)

( * ) Notice: Subject to any disclaimer, the term of this patent is extended or adjusted under 35 U.S.C. 154(b) by 130 days.

(21) Appl. No.: 10/328,891

(22) Filed: Dec. 24, 2002

(65) Prior Publication Data

US 2003/0127941 A1 Jul. 10, 2003

(30) Foreign Application Priority Data

Dec. 26, 2001 (JP) ...................................... 2001-393517

(51) Int. Cl.[7] ........................ H02K 13/00; H01R 39/20; H01R 39/26; H01R 39/18

(52) U.S. Cl. ....................... 310/251; 310/252; 310/253; 310/248

(58) Field of Search ................................ 310/251, 252, 310/253, 248

(56) References Cited

U.S. PATENT DOCUMENTS

| | | | | | |
|---|---|---|---|---|---|
| 3,654,504 | A | * | 4/1972 | Susdorf et al. | 310/239 |
| 4,119,572 | A | * | 10/1978 | Fridman et al. | 252/506 |
| 4,579,611 | A | * | 4/1986 | Broady | 156/64 |
| 6,245,440 | B1 | * | 6/2001 | Kuhlmann-Wilsdorf et al. | 428/611 |
| 6,700,292 | B2 | * | 3/2004 | Otani et al. | 310/248 |
| 6,755,882 | B2 | * | 6/2004 | Otani et al. | 75/231 |
| 6,758,881 | B2 | * | 7/2004 | Otani et al. | 75/231 |

FOREIGN PATENT DOCUMENTS

| | | | |
|---|---|---|---|
| GB | 823964 | | 11/1959 |
| JP | 63-143770 | | 6/1988 |
| JP | 2001-412962 | * | 4/2004 |

* cited by examiner

*Primary Examiner*—Darren Schuberg
*Assistant Examiner*—Julio C. Gonzalez
(74) *Attorney, Agent, or Firm*—The Webb Law Firm, P.C.

(57) ABSTRACT

A metal-graphite brush comprises a brush body which is made by mixing and molding metal powder and graphite powder. 2 mg to 30 mg as amounts of phosphate ion of at least one of phosphoric acid and a phosphate compound is added to 1 g of the brush body of the metal-graphite brush.

3 Claims, 1 Drawing Sheet

11

METAL-GRAPHITE BRUSH

FIELD OF THE INVENTION

The present invention relates to metal-graphite brushes which are used in electrical revolving armatures such as motors and generators, and in particular, improvements of the sliding characteristics of metal-graphite brushes.

PRIOR ART

Metal-graphite brushes have been used as brushes for low-voltage operation, for example, for electrical motors in automobiles. Metal-graphite brushes are produced by mixing graphite and metal powders such as copper powder, and molding and sintering the mixture. As they are operated at low voltages, their resistivities are lowered by adding the metal powders of which resistance is lower than that of graphite. To enhance the durability of metal-graphite brushes, the additives are contrived in varied ways; a metal sulfide solid lubricant, such as molybdenum disulfide or tungsten disulfide, or lead is added to metal-graphite brushes in many cases, to produce fair durability-enhancing effects.

In recent years, however, motors have been improved in efficiency and reduced in size more than ever before, and in turn, brushes are required to realize higher durability and efficiency. Such requirements cannot be met by merely relying on the conventional substances such as molybdenum disulfide, tungsten disulfide and lead. When metal-graphite brushes slide on a commutator, graphite and copper being the brush components form coats on the commutator. It is generally believed that such coats provide lubrication to prevent wears of the commutator and the brushes. However, the form of such coats depends on the specifications and service conditions of the motor, and components of additives. If the coats are too thick or have irregularities, such states will cause wears on the brushes and the commutator. If the coats are too thick, the resistance at the contact faces will increase, causing a drop in the motor output. This is a serious problem to the present motors which are demanded to have higher efficiencies.

Additives which are normally used to enhance the durability of the brushes, such as metal sulfide solid lubricants and Pb, tend to make a thick coat when applied singly. Furthermore, they tend to have irregularities in coats, resulting in excessive wear of the commutator or a drop in the output. To prevent such problems, a coating modifier such as silica, alumina, iron powder or manganese powder is added in some cases to grind down the too-thick coats. The addition of a coating modifier, however, tended to cause troubles such as wear of the commutator.

Patent document 1: Japanese Patent Opening Sho 63-143770

Patent document 1 discloses that silica being a coating modifier, and a phosphorus compound such as Cu3P, SnP or AgP are added to a brush comprising graphite, copper powder and molybdenum disulfide. Patent document 1 teaches that the addition of a phosphorus compound enhances the strength and hardness of copper.

SUMMARY OF THE INVENTION

The primary object of the invention is to prevent the wear of metal-graphite brushes and the wear of commutators and to prevent drops in the outputs of electrical revolving armatures.

In the present invention, a metal-graphite brush comprising a brush body which is made by mixing and molding metal powder and graphite powder is characterized in that at least one of phosphoric acid and a phosphate compound is added to said brush body.

As the effects of the addition of at least one of phosphoric acid and a phosphate compound are particularly significant for brush bodies containing a metal sulfide solid lubricant such as MoS2 or WS2, preferably, the brush body contains a metal sulfide solid lubricant in addition to a metal and graphite. The content of the metal sulfide solid lubricant in the brush body is, for example, from 0.3 to 6 wt % (3~60 mg/1 g of the brush body material), and preferably, from 1 to 5 wt %.

At least one of phosphoric acid and a phosphate compound improves on the sliding characteristics of the commutator and the brush body. Said at least one of phosphoric acid and a phosphate compound may be added to the brush body homogeneously, but said at least one of phosphoric acid and a phosphate compound may be added only to the sliding part of the brush against which the commutator slides. The effect of the addition of said at least one of phosphoric acid and a phosphate compound is basically attributed to the addition of phosphate ion ($PO_4^{3-}$) or phosphate radical. Accordingly, the content of the addition is shown as the weight of phosphate ion, and the denominator being the weight of the brush body material includes the weight of at least one of phosphoric acid and a phosphate compound. When said at least one of phosphoric acid and a phosphate compound is not homogeneously added to the brush body, the amount of the additives is defined as the amount of that added to the brush body material on the sliding side which slides against the commutator.

Preferably, the phosphoric acid or the phosphate compound is added at least to the sliding side of the brush body which slides against the commutator, and the total addition of the phosphoric acid or the phosphate compound is 1 to 40 mg as an amount of phosphate ion ($PO_4^{3-}$) per 1 g of the brush body material of the sliding side which slides against the commutator. More preferably, the amount of the additives is 2 to 35 mg as an amount of phosphate ion ($PO_4^{3-}$) per 1 g of the brush body material of the sliding side which slides against the commutator. In the following, the addition of at least one of phosphoric acid and a phosphate compound may be referred to as addition of phosphate ion for the sake of simplicity.

Preferably, phosphate ion is added, for example, in the form of transition metal salts such as manganese phosphate, zinc phosphate, nickel phosphate or copper phosphate, tin phosphate or indium phosphate. At least one of phosphoric acid and a phosphate compound may be added, for example, in the form of calcium phosphate or aluminum phosphate, or P2O5, etc. Preferably, at least one of phosphoric acid and a phosphate compound is added as at least a metal salt of a group comprising transition metals, indium and tin.

The metal-graphite brush of the present invention can control wears on both the brush and the commutator, and can prevent drops in outputs of electrical revolving armatures.

When the brush body contains a metal sulfide solid lubricant, particularly good effects can be obtained.

The present invention is particularly suited to metal-graphite brushes for heavy loads, such as brushes for starting motors, but it is also applicable to brushes for small-sized motors and the like and is not limited in applications.

When 1 mg or over of phosphate ion is added to 1 g of the brush body material of the sliding side of the brush body, excellent effects will be obtained as shown, for example, in Table 2 and Table 3,in preventing wears on brushes and commutators and in preventing drops in the powers of electrical revolving armatures. These effects are particularly significant when 2 mg or over of phosphate ion is added to 1 g of the brush body material of the sliding side. In the following, the concentrations of phosphate ion are shown as amounts of the phosphate ion in a unit of mg per 1 g of the brush body material on the sliding side of the brush body, and indicated by the unit of mg/g. The effect of preventing wears on brushes and commutators and the effect of preventing the drops in the outputs of the rotating machines will increase when the phosphate ion concentration is increased. However, as the addition of phosphate ion by more than 40 mg/g will increase the resistivity of the brush body, the addition of phosphate ion is preferably 40 mg/g or under, and more preferably, 35 mg/g or under. The most preferable addition of phosphate ion is from 2 to 25 mg/g. Phosphate ion is preferably added in the form of transition metal salts, tin salt, or indium salt, as described above.

EMBODIMENTS

Figure 1:
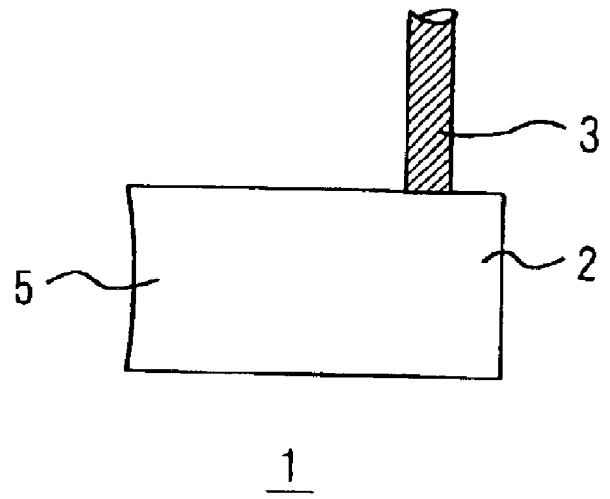
FIG. 1 is a side view of a brush of an embodiment.

Copper powder is mainly used as metal powder, but silver powder, or a mixed powder of copper powder and silver powder, etc. may be used. The resistance of the brush can be kept low by the use of copper powder. Therefore, electrolytic copper powder is used in many cases, and other copper powders such as atomized copper powder and crushed copper powder may be used. As for graphite powder, natural graphite is preferable from the viewpoints of lubrication and resistivity, etc., but artificial graphite or a mixed powder of natural graphite and artificial graphite may be used. When the copper content is 70% or over, graphite powder may be used without any binder. However, when the copper content is smaller and the graphite content is larger, the brush is not easily sinterable. Therefore, it is preferable to treat the surface of the graphite powder with a synthetic resin such as phenol resin varnish.

As for phosphate compounds, transition metal salts of phosphoric acid such as copper phosphate, nickel phosphate, manganese phosphate and zinc phosphate, tin phosphate, and indium phosphate, etc. are preferable. In addition to them, calcium phosphate, aluminum phosphate or antimony phosphate, etc. may be used. The addition of calcium phosphate or aluminum phosphate is analogous to the addition of calcium oxide or aluminum oxide being a coating modifier in combination with phosphoric acid, and this addition exhibits the effects of preventing wears on the brush and the commutator and preventing the power drop. When phosphoric acid is added in the form of phosphorus pentoxide or the like, the addition produces the effects of preventing wears on the brush and the commutator and preventing the power drop. It is not clear whether those effects are the effects of phosphorus pentoxide itself or the effects of copper phosphate produced by the reaction with copper powder in the brush. Lead phosphate is also effective, but it is not desirable from the viewpoints of environment.

The mechanism by which at least one of phosphoric acid and a phosphate compound improves on the durability of brushes and the commutator and moderates output drops of rotating machines is not clear. However, it is estimated that the addition of at least one of phosphoric acid and a phosphate compound leads to the formation of homogeneous and optimal coats. At least one of phosphoric acid and a phosphate compound may be added singly, but particularly good effects will be obtained when it is used together with a metal sulfide solid lubricant such as molybdenum disulfide or tungsten disulfide. For example, even when the use of a metal sulfide solid lubricant alone results in excessively thick coats, and in turn, output drops, the addition of at least one of phosphoric acid and a phosphate compound can prevent these troubles.

Phosphate ion is added, for example, by 1 to 40 mg as an amount of phosphate ion per 1 g of the brush body material on the sliding side of the brush body, and preferably, 2 to 35 mg/g. When the addition of phosphate ion is 1.3 mg/g, it has some effects. When the addition is about 2 mg/g, it starts to have significant effects, and when the addition is more than 40 mg/g, the resistivity of the brush body increases. Hence, preferably, the addition is 40 mg/g or under, and more preferably, 35 mg/g or under, and most preferably, 25 mg/g or under.

Figure 2:
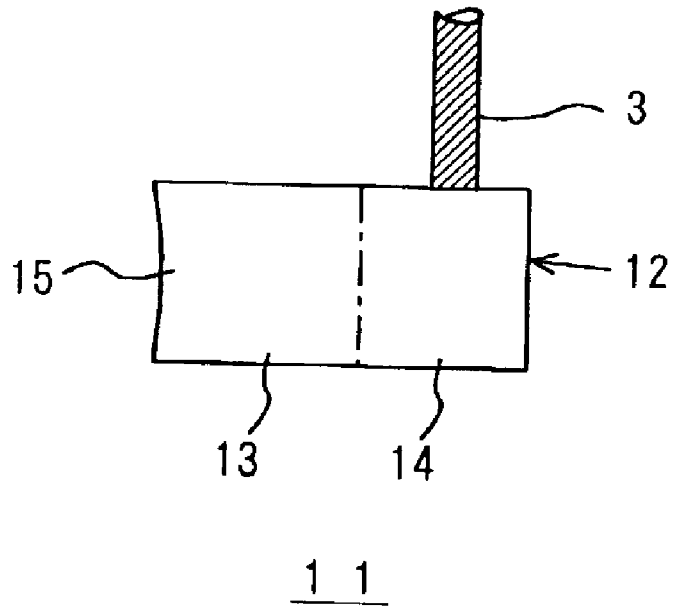
FIG. 2 is a side view of a brush of a modification.

The configurations of the metal-graphite brushes are shown in FIG. 1 and FIG. 2. As for the metal-graphite brush 1 of FIG. 1, 2 denotes a brush body, 3 denotes a lead wire of a copper stranded wire, which is simultaneously embedded at the time of molding, 5, 15 denote a sliding face, which contacts the commutator of a rotating machine. In the embodiment shown in FIG. 1, a phosphate salt was homogeneously added to the brush body 2, and the molding of the brush body 2 and the embedding of the lead wire 3 were simultaneously done. In the metal-graphite brush 11 of FIG. 2, the brush body 12 was divided into a sliding side 13 and a lead side 14, and at least one of phosphoric acid and a phosphate compound was added only to the sliding side 13. At the time of molding, the portion for the lead side 14 was blocked by a movable die which is not illustrated, then a raw material of the sliding side 13 was fed. Next, the movable die was retracted, and a raw material of the lead side 14 was fed, and the lead wire 3 was embedded concurrently with the pressing to form the brush body 12 and the lead wire 3. In both cases, after the molding, the moldings were sintered in a non-oxidizing atmosphere at, for example, 300~900° C. to complete the metal-graphite brushes 1, 11. In the following, the metal-graphite brush is simply referred to as a brush in some occasions.

EXAMPLES

Examples will be described below. The brush is a brush for a starting motor. The structure of the brush is shown in FIG. 1, and the dimensions of the brush body are 13.5 mm in length, 13 mm in width, and 6.5 mm in thickness. The lead wire 6 is a stranded wire of non-electroplated copper wires, and its diameter is 3.5 mm and the depth of its embedded part is 5.5 mm.

Example 1

20 parts by weight of novolak type phenol resin dissolved in 40 parts by weight of methanol were mixed with 100 parts by weight of natural flaky graphite. The mixture was homogeneously mixed by a mixer, then methanol was dried out of the mixture by a drier. The residue was crushed by an impact crusher and screened by an 80 mesh pass sieve (a 198 $\mu$m pass sieve) to obtain a resin-finished graphite powder.

66.6 parts by weight of electrolytic copper powder having a mean particle diameter of 30 $\mu$m, 3 parts by weight of molybdenum disulfide powder, and 0.4 part by weight of zinc phosphate powder ($Zn3(PO4)2$,formula weight=386.1) were added to 30 parts by weight of the resin-finished graphite powder. They were homogeneously mixed by a V type mixer to obtain a compounded powder. The compounded powder was fed from a hopper into a die, the top end of the lead wire 3 was embedded in the compounded powder in the die, and the compounded powder was molded under a pressure of $4\times10^8$ Pa ($4\times9800$ N/cm$^2$). The molding was sintered in a reducing atmosphere in an electric furnace at 700° C. to obtain a brush of example 1.

Example 2

63 parts by weight of the electrolytic copper powder, 3 parts by weight of the molybdenum disulfide powder, and 4 parts by weight of the zinc phosphate powder were added to 30 parts by weight of the resin-finished graphite powder. They were treated in the same manner as example 1 to obtain a brush of example 2.

Example 3

64.5 parts by weight of the electrolytic copper powder, 3 parts by weight of the molybdenum disulfide powder, and 2.5 parts by weight of the zinc phosphate powder were added to 30 parts by weight of the resin-finished graphite powder. They were treated in the same manner as example 1 to obtain a brush of example 3.

Example 4

The composition of the compounded powder was changed to 3 parts by weight of manganese phosphate powder (Mn(PO4), formula weight=149.9), 64 parts by weight of the electrolytic copper powder, 30 parts by weight of the resin-finished graphite powder, and 3 parts by weight of the molybdenum disulfide powder. This compounded powder was treated in the same manner as example 1 to obtain a brush of example 4.

Examples 5 through 7

In the composition of example 1,zinc phosphate was changed to 0.25 part by weight, and electrolytic copper powder was changed to 66.75 parts by weight. The compounded powder was treated in the same manner as example 1 to obtain a brush of example 5. In the composition of example 1,zinc phosphate was changed to 6 parts by weight, and electrolytic copper powder was changed to 61 parts by weight. The compounded powder was treated in the same manner as example 1 to obtain a brush of example 6. Examples 5 and 6 are cases of the two extreme quantities of phosphate ion. Furthermore, in the composition of example 4,manganese phosphate powder was changed to 3 parts by weight of calcium phosphate powder (Ca3(PO4)2,formula weight=310.19), and the compounded powder was treated in the same manner as example 4 to obtain a brush of example 7. This brush represents the addition of an alkali metal salt or an alkali earth metal salt of phosphoric acid.

Example 8

67 parts by weight of the electrolytic copper powder and 3 parts by weight of molybdenum disulfide powder were added to 30 parts by weight of the resin-finished graphite powder used in example 1. The compounded powder was treated in the same manner as example 1 to obtain a brush of example 8. This brush is a conventional brush containing no phosphoric acid nor phosphate compound.

The composition of each brush after sintering changes a little from the composition of the compounded powder because novolak type phenol resin is partially decomposited and lost in weight at the time of sintering. The phosphate ion content and the brush body resistivity of each of the brushes of examples 1 through 6 are shown in Table 1. The resistivity was measured by the 4-terminal method in the direction perpendicular to the pressing direction at the time of molding the brush body. When the content of phosphate ion was increased, the brush body resistivity started to increase at about 20 mg/g.

TABLE 1

Phosphate ion content and the brush body resistivity

| Sample | Phosphate ion (mg $PO_4^{3-}$/g) | Phosphate compound concentration (wt %) | Brush body resistivity ($\mu\Omega \cdot$ cm) |
|---|---|---|---|
| Example 1 | 2.0 | 0.4 | 22.5 |
| Example 2 | 20.2 | 4.1 | 26.8 |
| Example 3 | 12.8 | 2.6 | 23.4 |
| Example 4 | 19.6 | 3.1 | 23.8 |
| Example 5 | 1.3 | 0.26 | 22.3 |
| Example 6 | 30.5 | 6.2 | 31.5 |
| Example 7 | 19.5 | 3.1 | 24.3 |
| Example 8 | 0 | 0 | 22.1 |

* In examples 1~3, 5, and 6, phosphate ion was added in the form of zinc phosphate. In example 4, phosphate ion was added in the form of manganese phosphate, and in example 7, in the form of calcium phosphate. No phosphate ion was added in example 8.

The brushes of examples 1 through 8 were assembled in a starting motor of an output of 1.4 kW with four brushes. The motor was set on an in-line 4-cylinder diesel engine test bench. The stroke volume of the engine was 2200 cc. The cranking load current was 160 A and the battery voltage was 13.5 V. The test cycle was cranking for 1 second, over-run for 1 second and stop for 28 seconds; thus one period was 30 seconds. The brushes were subjected to an endurance test of 10000 cycles. The overall lengths of the four brushes were measured by a micrometer before and after the test, and a largest wear was defined as an amount of wear. As for the wear of commutators, the outer diameters of the commutators were measured by a micrometer before and after the test to determine amounts of wear. The test results concerning the wears of the brushes and the commutators are shown in Table 2. The motor output was also measured by an output tester before and after the test. The results are shown in Table 3.

TABLE 2

Amounts of wear on the brushes and the commutator due to the endurance test

| Sample | Amount of wear (mm) Brush | Commutator |
|---|---|---|
| Example 1 | 1.26 | 0.06 |
| Example 2 | 1.04 | 0.04 |
| Example 3 | 1.18 | 0.05 |
| Example 4 | 1.15 | 0.04 |
| Example 5 | 2.16 | 0.08 |
| Example 6 | 1.04 | 0.04 |
| Example 7 | 1.22 | 0.06 |
| Example 8 | 2.96 | 0.14 |

TABLE 3

| Output drop due to the endurance test | | | |
|---|---|---|---|
| | Output (kW) | | |
| Sample | Output before test | Output after test | Output drop |
| Example 1 | 1.62 | 1.61 | 0.01 |
| Example 2 | 1.61 | 1.60 | 0.01 |
| Example 3 | 1.62 | 1.61 | 0.01 |
| Example 4 | 1.62 | 1.61 | 0.01 |
| Example 5 | 1.62 | 1.56 | 0.06 |
| Example 6 | 1.59 | 1.58 | 0.01 |
| Example 7 | 1.62 | 1.60 | 0.02 |
| Example 8 | 1.63 | 1.52 | 0.11 |

In examples 1 through 7, both the brush wear and the commutator wear were small and the output drop after the test was small. In contrast to them, example 8, to which phosphoric acid and a phosphate compound were not added, showed serious wears on both the brush and the commutator, and the output drop after the test was marked. The replacement of zinc phosphate with manganese phosphate (example 4) and the replacement of zinc phosphate with calcium phosphate (example 7) showed similar results. This indicates that the presence of phosphate radical (phosphate ion) is more important than the kind of the metal salt used. However, in the case of calcium phosphate, when the phosphate ion concentration was comparable to those of zinc phosphate and manganese phosphate, the amounts of wear on the brush and the commutator were rather greater. Hence transition metal salts, indium salt and tin salt are desirable for phosphate ion source. Next, in the case of example 5 in which the addition of phosphate ion is small, the levels of wears and output drop were between those of examples 1 through 4 and those of example 8 having no phosphate ion. These results indicate that the effects of the addition of phosphate ion become apparent at around 1 mg/g. In example 6 in which the great amount of phosphate ion was added, the resistivity of the brush body increased.

Composite Effects of Phosphate Ion and Metal Sulfide Solid Lubricant

To check how the effects of phosphate ion change in the presence or absence of a metal sulfide solid lubricant, the following test was carried out. 64.5 parts by weight of electrolytic copper powder having a mean particle diameter of 30 $\mu$m and 2.5 parts by weight of zinc phosphate powder were added to 33 parts by weight of the resin-finished graphite powder used in example 1. They were homogeneously mixed by the V type mixer. The resulted compounded powder was fed from a hopper into dies, the top end of the lead wire 3 was embedded in the compounded powder in the dies, and the compounded powder was molded under a pressure of $4\times10^8$ Pa ($4\times9800$ N/cm$^2$). The molding was sintered in a reducing atmosphere in an electric furnace at 700° C. to obtain a brush (example 9). The difference of this brush from that of example 3 is that the former contains no metal sulfide solid lubricant. 66.5 parts by weight of electrolytic copper powder, 33 parts by weight of resin-finished graphite powder and 0.5 part by weight of zinc phosphate were treated in the same manner as example 9 to obtain a brush (example 10). The phosphate ion concentration in example 9 was 12.8 mg$PO_4^{3-}$/g, and that in example 10 was 2.5 mg $PO_4^{3-}$/g. To produce a control brush for comparison with the brushes of examples 9 and 10, 33 parts by weight of the resin-finished graphite powder and 67 parts by weight of the electrolytic copper powder were mixed, and they were treated under the same conditions to prepare a brush (example 11).

Brushes were prepared in a manner similar to that of example 9 by using 1 part by weight of molybdenum disulfide and varying the content of zinc phosphate to 2.5 parts by weight (example 12) and to 0 (example 13). The content of the resin-finished graphite powder was 30 parts by weight in both examples 12 and 13,and the contents of the electrolytic copper powder were 66.5 parts by weight in example 12 and 69 parts by weight in example 13.

TABLE 4

| Contents of zinc phosphate and molybdenum disulfide and brush body resistivity | | | |
|---|---|---|---|
| Sample | Zinc phosphate content (wt parts) | Molybdenum disulfide content (wt parts) | Brush body resistivity ($\mu\Omega\cdot$cm) |
| Example 9 | 2.5 | 0 | 22.6 |
| Example 10 | 0.5 | 0 | 22.0 |
| Example 11 | 0 | 0 | 21.8 |
| Example 12 | 2.5 | 1 | 22.0 |
| Example 13 | 0 | 1 | 21.0 |

Brushes of example 3 (containing 2.5 parts by weight of zinc phosphate and 3 parts by weight of molybdenum disulfide) and of examples 9 through 13 were subjected to an endurance test under the same conditions as those of Table 2. The results obtained on the 2200 cc in-line 4-cylinder diesel engine test bench after 10,000 times of the endurance cycle are shown in Table 5. It is clearly shown in Table 5 that zinc phosphate exhibited particularly marked effects when it was used in combination with a metal sulfide solid lubricant. Similarly, when the metal sulfide solid lubricant was changed to tungsten disulfide and when zinc phosphate was changed to manganese phosphate or calcium phosphate or phosphorus pentoxide, particularly marked effects are obtained by use of a metal sulfide solid lubricant is used together with at least one of phosphoric acid and a phosphate compound was also demonstrated.

TABLE 5

| Effects in combination with a metal sulfide solid lubricant | | | | |
|---|---|---|---|---|
| | Brush wear (mm) | Commutator wear (mm) | Output before test (kW) | Output after test (kW) |
| Example 3 | 1.18 | 0.05 | 1.62 | 1.61 |
| Example 9 | 3.56 | 0.16 | 1.63 | 1.51 |
| Example 10 | 4.64 | 0.16 | 1.63 | 1.51 |
| Example 11 | 6.43 | 0.18 | 1.62 | 1.50 |
| Example 12 | 1.22 | 0.06 | 1.63 | 1.59 |
| Example 13 | 3.78 | 0.16 | 1.64 | 1.53 |

* In examples 3 and 12, zinc phosphate and molybdenum disulfide were used in combination.
* In examples 9 and 10, only zinc phosphate was added.
* In examples 11 and 13, no zinc phosphate was added.

As shown above, in the embodiments, wears on the brushes and the commutators can be controlled and a drop in the output of a rotating machine can be prevented by adding at least one of phosphoric acid and a phosphate compound to the metal-graphite brush. The embodiments showed these effects in relation to Pb-less brushes to which no lead is added, but these effects can be obtained in leaded brushes as well. The results are the same when tungsten disulfide is used in place of molybdenum disulfide.

Supplement

A brush to which a phosphorus compound was added in place of the phosphate compound was prepared. Copper phosphide ($Cu3P$) was used as the phosphorus compound, but other materials and the brush preparation conditions were similar to those of example 1. 30 parts by weight of the resin-finished graphite, 64.5 parts by weight of electrolytic copper powder, 3 parts by weight of molybdenum disulfide and 2.5 parts by weight of copper phosphide were mixed well in a V-type mixer. The mixture was molded with the top end of a lead wire being embedded in the molding, and the molding was sintered in a reducing atmosphere at 700° C. to obtain a brush (example 14). When the molding is sintered at 700° C. , the resin binder in the resin-finished graphite will be thermally decomposited to turn into carbon. Data for each item of Table 1 through Table 3 were collected for this brush.

The brush body resistivity was 26.3Ω·cm and was comparable to that of example 2 (26.8Ω·cm) to which zinc phosphate was added by 4.1 wt %. In an endurance test using the starting motor of 1.4 kW in output, the amounts of wear after 10000 times of the cycle were 2.55 mm on the brush side and 0.16 mm on the commutator side. They were comparable to those of example 8 to which no phosphate compound was added. The motor output before this endurance test was 1.60 kW and that after the test was 1.55 kW, and the results were comparable to those of example 5 to which zinc phosphate was added by 0.26 wt %. In the light of these findings, the use of a phosphorous compound in place of a phosphate compound cannot be expected to be effective in preventing wears on the brushes and the commutators or in preventing a drop in the output of the rotating machine. Besides this, the three-point bending strength of each brush was measured as well. In example 14 in which copper phosphide was added by 2.5 wt % in place of zinc phosphate by 2.6 wt %, the three-point bending strength increased by about 5% in comparison with example 3 in which zinc phosphate was added by 2.6 wt %. This agrees qualitatively with Japanese Patent Opening Sho 63-143770 which discloses that a phosphorus compound enhances the strength or the hardness of copper.

It is discretionary whether the brush contains any component other than metal powder, graphite powder, at least one of phosphoric acid and a phosphate compound, and a metal sulfide solid lubricant such as molybdenum disulfide or tungsten disulfide. However, preferably, the brush does not contain silica being a coating modifier, nor metallic tin powder.

What is claimed is:

1. A metal-graphite brush comprising a brush body with brush material, made by mixing and molding metal powder and graphite powder wherein at least one of phosphoric acid and a phosphate compound is added to said brush body, wherein said brush body further contains a metal sulfide solid lubricant, and wherein said at least one of phosphoric acid and a phosphate compound is added at least to a sliding side of the brush body to be in contact with a commutator and that the total amount of addition of said at least one of phosphoric acid and a phosphate compound is from 1 to 40 mg as an amount of phosphate ion ($PO_4^{3-}$) per 1 g of said brush material in the sliding side of the brush body to be in contact with the commutator.

2. The metal-graphite brush of claim 1 wherein said at least one of phosphoric acid and a phosphate compound is a phosphate salt of at least one metal of a group comprising transition metals, indium and tin.

3. A metal-graphite brush comprising a brush body made by mixing arid molding metal powder and graphite powder, wherein at least one of phosphoric acid and a phosphate compound is added to said brush body and wherein said at least one of phosphoric acid and phosphate compound is added at least to a sliding side of the brush body to be in contact with a commutator and that the total amount of addition of said at least one of phosphoric acid and a phosphate compound is from 1 to 40 mg as an amount of phosphate ion ($PO_4^{3-}$) per 1 g of said brush material in the sliding side of the brush body to be in contact with the commutator.

* * * * *

UNITED STATES PATENT AND TRADEMARK OFFICE

CERTIFICATE OF CORRECTION

PATENT NO. : 6,949,863 B2
DATED : September 27, 2005
INVENTOR(S) : Otani et al.

It is certified that error appears in the above-identified patent and that said Letters Patent is hereby corrected as shown below:

Column 10,
Line 26, "mixing arid molding" should read -- mixing and molding --.

Signed and Sealed this

Twenty-fifth Day of April, 2006

JON W. DUDAS
*Director of the United States Patent and Trademark Office*